INVENTOR.
BY GEORGE MORDWINKIN
ATTORNEY:

INVENTOR.

BY GEORGE MORDWINKIN

Dec. 6, 1966 G. MORDWINKIN 3,290,486
TEMPERATURE SENSING AND CONTROL SYSTEM
Filed April 9, 1964 4 Sheets-Sheet 4

INVENTOR.

BY GEORGE MORDWINKIN
ATTORNEY:

United States Patent Office 3,290,486
Patented Dec. 6, 1966

3,290,486
TEMPERATURE SENSING AND CONTROL SYSTEM
George Mordwinkin, Norwalk, Conn., assignor to Sensor Corporation, Greenwich, Conn., a corporation of Connecticut
Filed Apr. 9, 1964, Ser. No. 358,557
16 Claims. (Cl. 219—499)

The present invention relates to temperature sensing and temperature control systems. More particularly my invention relates to a new solid-state control circuit for providing universal temperature control and regulation, in which a single transistor form free running multi-vibrator is used in conjunction with an adjustable, temperature sensitive balanced bridge circuit for providing signals for controlling a heating and/or cooling device.

A signal selective coupling receives signal outputs of the temperature sensitive balanced bridge circuit and selectively provides one or the other of several outputs at individual output terminals, one output terminal of which may be connected to a circuit providing absolute control of a heating device, and the other terminal may be connected to a circuit providing absolute control of a cooling device.

The temperature control system described herein may be used to control a heating device or element or a cooling device, as an over-all system or the system may be complexed so as to provide control over both a heating device and a cooling device if desired.

From a broad aspect, a complex temperature sensing and control system, such as described herein, may be used in which a heating device and a cooling device are employed to maintain the temperature, within some substantially confined device or space, substantially constant, where the confined space is subjected to a very wide range of ambient temperatures. A common temperature sensing device, such as my adjustable temperature sensitive balanced bridge circuit, may serve to provide a signal indicative of the need for cooling due to, for example, the ambient temperature being higher than desired, so as to tend to increase the temperature of the confined device or space. Such signal will be selected by the signal selective coupling and will be applied to the terminal for connection to the control circuit of the cooling device and call for cooling the confined device. The same signal is applied to the terminal for connection to the control circuit of the heating device and is used to hold the heating device cut-off. When the confined device or space is subjected to an ambient temperature that tends to decrease or lower the temperature below the desired range, the common sensing device may serve to provide a signal indicative of the need for heat so as to maintain the temperature of the confined space within the desired temperature range. The signal indicative of the need for heat will be applied by the signal selective coupling to the terminal for connection to the control circuit of the heating device and call for heat. The latter same signal will also be applied to the terminal for connection to the control circuit of the cooling device and is used to hold the cooling device cut-off.

From a more limited aspect, my temperature control system may be used to control the temperature of a body of matter, whether solid, liquid or gas through control of the heating or cooling device in accordance with the temperature of the body of matter, with respect to the desired temperature.

My new universal temperature control system, either in complex form, for temperature maintenance control over a very wide range of ambient temperatures or its less complex form, for controlling the temperature of matter, where the ambient temperature range is substantially narrow, has wide and varied potential of application.

A free running, unijunction transistor multi-vibrator is employed with an adjustable temperature sensitive balanced bridge circuit.

The output pulses of the free running multi-vibrator are applied to the adjustable temperature sensitive balanced bridge circuit with the bridge circuit serving to provide load for the unijunction transistor. When the bridge circuit is in balance the potentials at opposite terminals will be substantially equal. When the bridge circuit is driven out-of-balance, the difference in potential at the same opposite terminals will be an indication of the temperature change sensed with the relative polarity differences representing an increase or a decrease respectively of temperature from the desired temperature and the amplitude of the difference in polarities corresponding to the amount of temperature change from the desired temperature.

I have found that the ratio between the pulse rate frequency of the multi-vibrator and the frequency of the alternating current (A.C.) source applied to the heating and/or the cooling device may serve as a measure of the degree of phase control over the phases of the A.C. input. An example of such control is with the pulse rate frequency of the multi-vibrator at a ratio of approximately 66 to 1 to the frequency of the A.C. source, passage of the individual phases of the A.C. waves to the heating or cooling device may be controlled within some six degrees of angle. A higher ratio will provide control down to one degree of angle while a smaller ratio between the frequencies will provide less sensitive angular control of the phases of the A.C. waves.

The control aspect over the individual waves of the A.C. source is very useful in that such type of very sensitive control over the A.C. input makes possible the control of a heater or cooling device, in direct proportion to the need required to maintain a constant temperature.

Such fine control, as may be obtained over a temperature changing device has great utility in the control of the temperature of molten plastic, for example. It is very desirable to be able to turn on a heater and/or to increase its thermal output very slowly, when heat is called for and to reduce its thermal output very slowly when heat is no longer required. Some plastics, while in a molten form, often become brittle after the plastic has been cooled to a solid state when subjected to excess heat or a rapid change of heat. Due to the density of molten plastics, circulation of the molten plastic is slow and a rapid increase of heat, may overheat the plastic adjacent to the heater before circulation of the molten plastic has moved the matter away from the heater. Thus a portion of the molten plastic may become subjected to excess heat and may become brittle when cooled. This condition results in unequal flexibility and/or strength in a single-piece plastic unit, even though the plastic was of the same "cooked" batch.

The preferred form of adjustable temperature sensitive balanced bridge circuit includes thermistors in two opposite legs of the bridge circuit and a variable resistor or potentiometer and fixed resistance in the other two opposite legs of the balanced bridge circuit. This construction of a temperature sensitive balanced bridge provides great sensitivity to changes in temperature and also accords a temperature sensing circuit which may be used in universal temperature control.

A temperature sensitive balanced bridge may be provided with one thermistor in one leg and a fixed resistor in the opposite leg, as will be explained below and has utility in certain forms of my invention. This latter arrangement lacks the fine sensitivity to temperature change found in the dual thermistor balanced bridge circuit.

It should be noted that I have employed thermistors with positive coefficient although negative coefficient thermistor could be used also. If negative coefficient thermistors were used in place of the positive coefficient thermistor the heat control terminal and the cold control terminal would be reversed.

The thermistors are employed as temperature change sensing components which vary in impedance, in accordance with temperature change. If, for example, a molten mass, such as molten plastic, is to be maintained at a substantially constant temperature or is to be heated to a predetermined desired temperature, and maintained at such desired temperature, the thermistors would be placed within the vessel containing such mass so as to be able to be affected by the temperature of the mass. As is known, the value of impedance of a thermistor is variable in accordance with temperature, such value of impedance being predeterminable according to temperature. The variable resistor or potentiometer forming one of the legs of the bridge may be calibrated in degrees of temperature so that a balanced condition around the bridge circuit may be obtained at a predetermined temperature, as sensed by the thermistors and represented as a value of impedance.

Opposite terminals of the balanced bridge circuit are connected through the coil of part of the signal selective coupling. Current flow through such coil is dependent upon the relation between two potentials, at opposite terminals of the bridge, one to the other, with respect to relative polarity, while the amplitude of current depends upon the differential between such polarities. Thus the direction of current flow through the coil will make one end of the coil more positive, with respect to the opposite end.

Thus three conditions of current flow are provided; an absence of current flow when the potentials at the opposite terminals of the bridge are equal; current flow in one direction when the potentials are unequal, with the potential at the upper terminal exceeding the potential at the lower terminal and current flow in the other direction when the potential at the lower terminal exceeds the potential at the upper terminal.

In accordance with one form of my invention, these three conditions of current flow are induced in a second coil or coils as an absence of signal, thereby holding the output of the signal selective coupling at ground or reference potential, at positive potential with respect to a reference or at negative potential with respect to the same reference.

The signals are applied to output terminals of the signal selective coupling for operating a heat control circuit or a cold control circuit in accordance with the signal provided at each respective terminal.

These terminals will be referred to as the heat control terminal and the cold control terminal. As described herein a heat control circuit may be connected to the heat control terminal and a cold control circuit may be connected to the cold control terminal.

According to the relative polarity and amplitude of the potential applied to the signal selective coupling, a relatively positive signal is applied to the heat control terminal or a relatively negative signal is applied to the cold control terminal, the amplitude of which is proportional to the differential between the two potentials at the opposite terminals of the bridge circuit.

In accordance with the preferred form of my invention as described herein, application of a positive signal to the heat control terminal provides reference or ground signal to the cold control terminal. Such condition drives the heat control circuit amplifier into operation and holds the cold control circuit amplifier cut off. Application of a negative signal to the cold control terminal provides a reference or ground signal to the heat control terminal. Such condition drives the amplifier of the cold control circuit into operation while holding the amplifier in the heat control circuit cut off. Thus since only one output terminal of the signal selective coupling is driving its associated amplifier at any one time only one of the amplifiers, for either heat control or cold control is driven to an operating condition at any one time.

If the temperature sensed is at the desired temperature, then the temperature sensitive balanced bridge circuit is in equilibrium and the signal applied to the selective coupling is substantially zero. This condition holds the amplifiers connected to the respective output terminals cut off.

The signal output for operating any amplifier is a signal which is pulsed at the pulse rate frequency of the free running multi-vibrator.

Assuming the signal to be a pulsed positive signal, the signal is amplified and applied to a split coupling which provides two substantially similar outputs. The outputs are individually applied to one each, of a pair of silicon controlled rectifiers connected back-to-back in the same one line of the A.C. source applied to the heating (or cooling) unit. Each of the ouputs of the split coupling serves as a control circuit for each of the rectifiers respectively. In this manner the individual polarities of the A.C. source applied to the heat (or cold) device are individually controlled. In order to provide more complete control over the A.C. source, each rectifier control circuit is individually adjustable thereby providing separate control of the relative value of the signal applied to each rectifier.

It is an object of the present invention to provide a temperature control circuit in which very small changes in temperature are sensed and proportionally compensated for.

Another object is to provide a fully solid-state component temperature control circuit employing individual angular phase control of the A.C. applied to the heating or cooling device in response to proportionally small changes in temperature.

Another object is to provide a temperature control system in which a unijunction transistor is coupled to a temperature sensitive balanced bridge circuit and a resistor-pacitor (RC) timing circuit thereby providing a free running multi-vibrator feeding into a temperature sensitive balanced bridge circuit.

Another object is to provide a universal temperature control system having a common temperature change sensing element for selectively providing individual control over a heating element and a cooling element.

A further object is to provide a temperature control circuit operable from a common A.C. source in which a multi-vibrator provides a pulsed output, the frequency of which is at a ratio to the frequency of the A.C. source, and the pulsed output of the multi-vibrator is used to provide adjustable phase control over the A.C. input to the temperature changing device and controls passage of the A.C. waves to a phase degree angle depending upon the ratio of the pulse rate frequency of the output to the frequency of the A.C. input.

A further object is to provide a temperature control system using solid-state components with very few elements.

A further object is to provide a temperature change sensing and control system which provides indications of temperature change in which the indications are substantially directly proportional to the temperature change sensed and using such indications for controlling a heating (or cooling) device in direct proportion to the need required to maintain a desired temperature.

These and other objects will become apparent from reading the following description with reference to the accompanying drawings in which.

Figure 1:
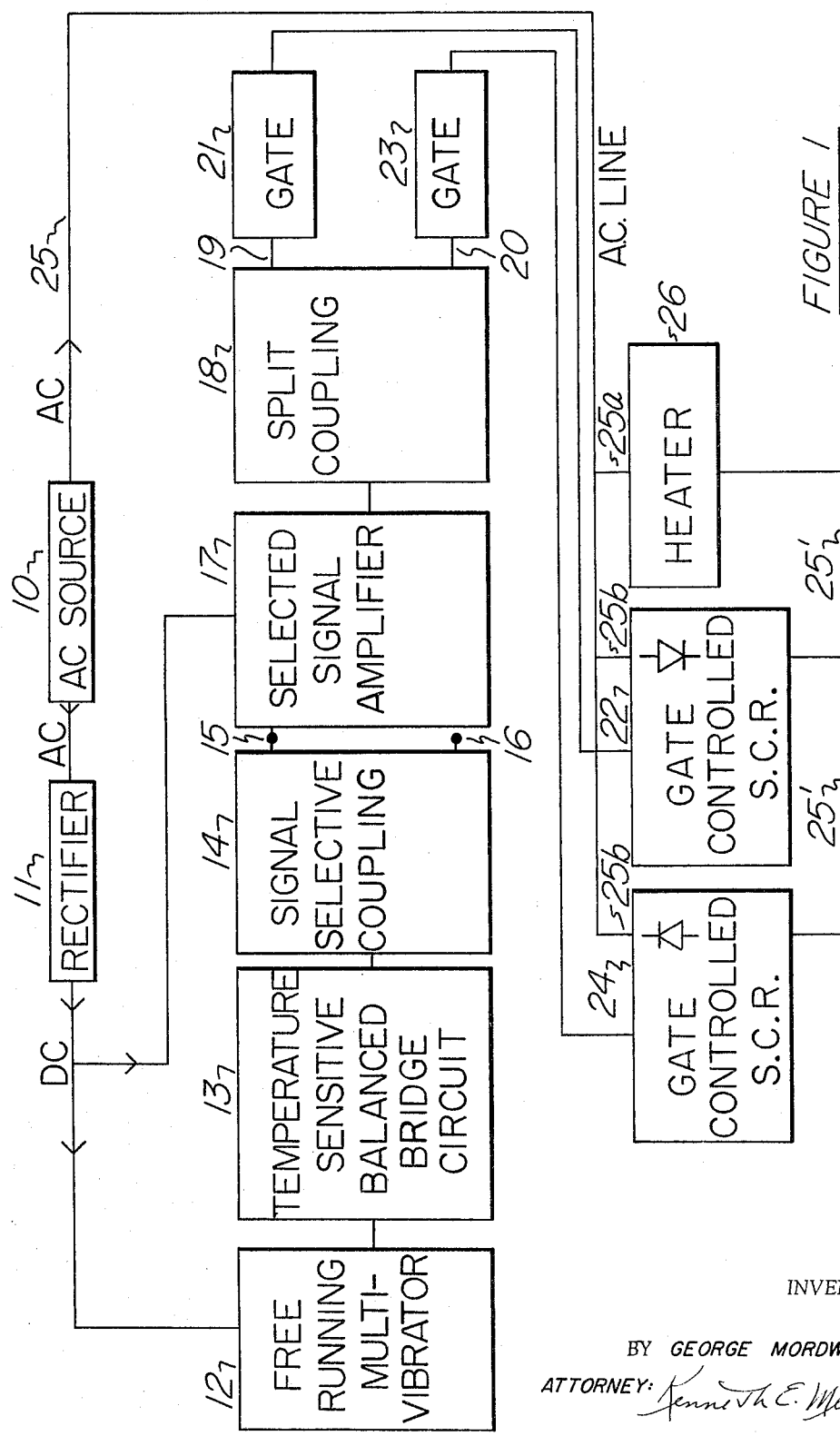
FIGURE 1 is a block diagram of a temperature control system for controlling a heating element.

Referring to the block diagram of FIGURE 1 it will be noticed that the A.C. Source 10 is applied to a Rectifier 11 which provides direct current (D.C.) to drive the Free Running Multi-vibrator 12. The pulsed output of the multi-vibrator is applied to the Temperature Sensitive Balanced Bridge Circuit 13. An output from the bridge circuit is applied to the Signal Selective Coupling 14, which has two output terminals 15 and 16. Terminal 15 represents the heat control terminal, terminal 16 represents the cold control terminal. The Selected Signal Amplifier 17 provides an output to the Split Coupling 18 which provides two substantially similar outputs 19 and 20. Output 19 is applied to the Gate 21 which is coupled to one silicon controlled rectifier, Gate Controlled S.C.R. 22. Output 20 of the Split Coupling is applied to the Gate 23 which is coupled to the other Gate Controlled S.C.R. 24.

Line 25 of the A.C. source represents two leads 25a and 25b. Lead 25a is represented as feeding one lead of the A.C. to the block Heater 26. The lead 25b represents that the other lead of the A.C. is fed to the back-to-back connected S.C.R's (silicon controlled rectifier) separately. Lead 25' represents the combined output of the S.C.R's which is fed to the other side of the Heater, block 26, for completing the A.C. circuit to the heater.

Figure 2:
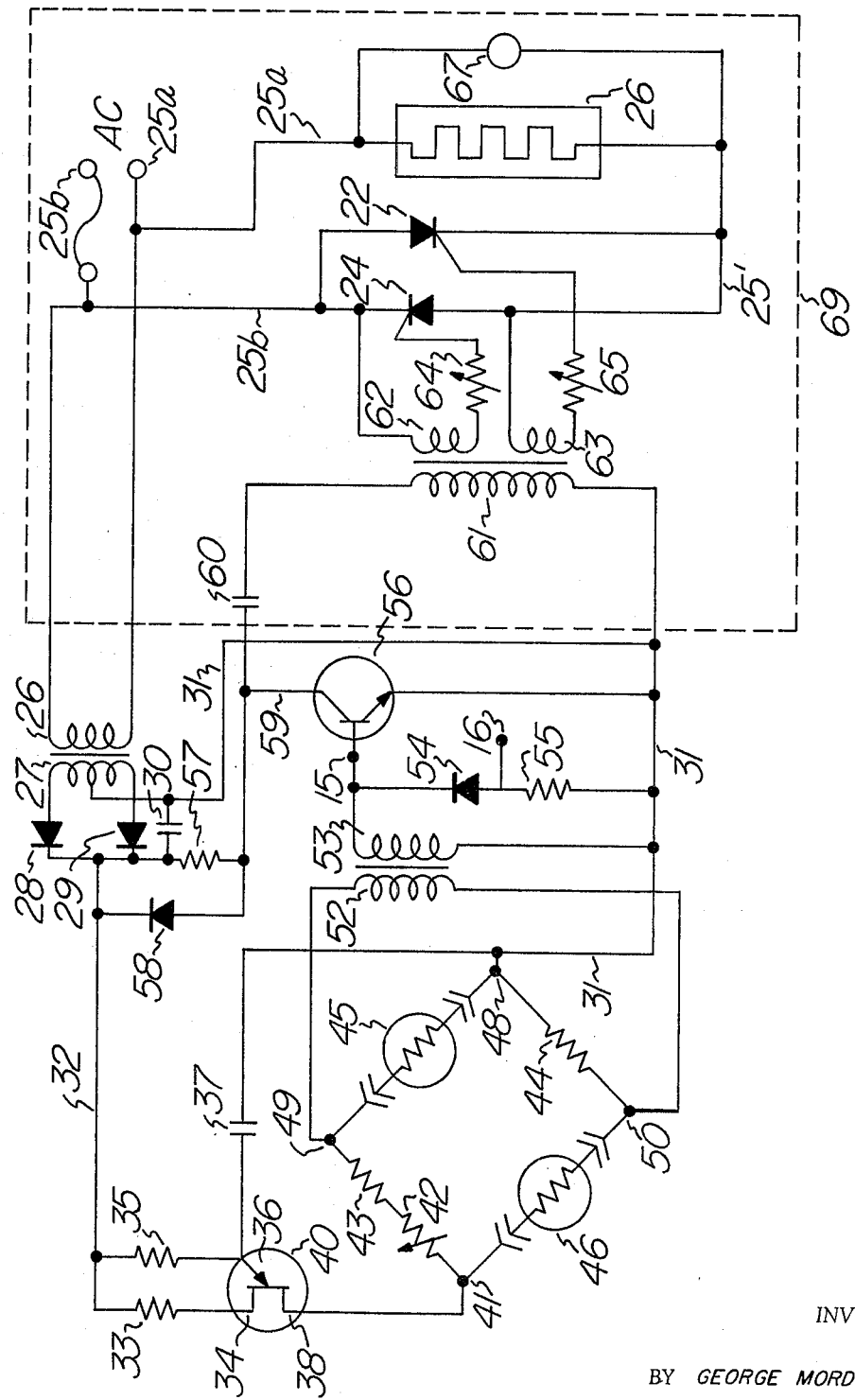
FIGURE 2 is a circuit diagram of a temperature control system for controlling a heating element.

Referring to one form of my invention in more detail, FIGURE 2 illustrates a circuit diagram showing the A.C. terminals or leads 25a and 25b applied to the coil 26 of a transformer. The coil 27 and diodes 28 and 29 illustrate a conventional solid-state full wave rectifier with lead 31 connected to a center tap of coil 27 for providing a D.C. reference or ground return. Capacitor 30 provides filtering action for eliminating or reducing the A.C. ripple on the D.C. provided by the rectifier circuit. It will be noticed that the D.C. provided herein is positive, with respect to the reference.

D.C. via lead 32 is applied to the upper base 34 of unijunction transistor 40, via resistor 33 and to the collector 36 via resistor 35. The time constant of resistor 35 and capacitor 37 determines the frequency or pulse rate of the positive D.C. pulses passed from base or terminal 34 of the unijunction transistor 40 to base or terminal 38, as controlled by collector or terminal 36. The output of terminal 38 is applied to terminal 41 and returned to D.C. reference or ground, lead 31, through the balanced bridge circuit. The impedance in the bridge circuit serving as load for the unijunction transistor.

Thus I have provided a free running solid state multivibrator employing but one unijunction transistor, a base one load resistor and an RC timing component with a ground return through an adjustable temperature sensitive balanced bridge circuit, serving as a base two load.

The adjustable temperature sensitive balanced bridge circuit includes variable resistor or potentiometer 42, and fixed resistor 43 on one leg. The opposite leg includes fixed resistor 44.

The other two legs are each provided with a thermistor, 45 and 46 respectively. The thermistors are illustrated as jack-plug connected since each may be physically removed, but electrically connected in the bridge circuit, so as to be placed in a position for sensing temperature change.

It will be observed that the pulsed signal from the terminal 38 of unijunction transistor 40 which is applied to terminal 41 is divided at such terminal passing through one path, including potentiometer 42, resistor 43 and thermistor 45 to terminal 48 and through the second path, including thermistor 46 and resistor 44 to terminal 48.

It therefore follows that when the bridge circuit is in balance the potentials at the opposite terminals 49 and 50 will be substantially equal.

Assuming the thermistors to have a positive coefficient, when the bridge circuit is out-of-balance, such as may result from a change in impedance value of the thermistors due to a drop in temperature from the desired temperature, the potential at terminal 50 will be more positive than the potential at terminal 49. An out-of-balance condition of the bridge resulting for an increase of temperature from the desired temperature will be indicated by the potential at terminal 49 being more positive than the potential at terminal 50.

The potentiometer 42 is provided as a means of adjusting the bridge so that a condition of balance will be obtained at a predetermined desired temperature. The potentiometer 42 may be calibrated in degrees of temperature.

This arrangement provides great sensitivity to temperature sensed by the thermistors over a substantially wide range of temperature.

It should be noted that by changing corresponding values in the various components of the bridge, wide range of temperature may be sensed and compensated for.

When the potential at terminal 49 is substantially equal to the potential at terminal 50 there is no current flow through the primary coil 52. Thus no signal is induced in coil 53 and terminals 15 and 16 are held at ground potential.

When the potential at terminal 50 is more positive than the potential at terminal 49 there is current flow through coil 52. Since the signal applied to the bridge circuit is a pulsed signal, the current flow through coil 52, which is proportional to the difference between the potentials at terminals 49 and 50, is a pulsating current which is induced or transferred as a control signal to coil 53. This control signal appears at terminal 15 as a positive pulsing voltage, pulsed at the pulse rate frequency of the multi-vibrator.

Diode 54 is connected to block any positive signal appearing at terminal 15 thus holding terminal 16 to substantially ground potential.

If, on the other hand the potential values at terminals 49 and 50 are reversed so that 49 is more positive than 50 then current flow through coil 52 would be reversed in direction of that described for the condition of the potential at 50 being more positive than at 49.

Figure 3:
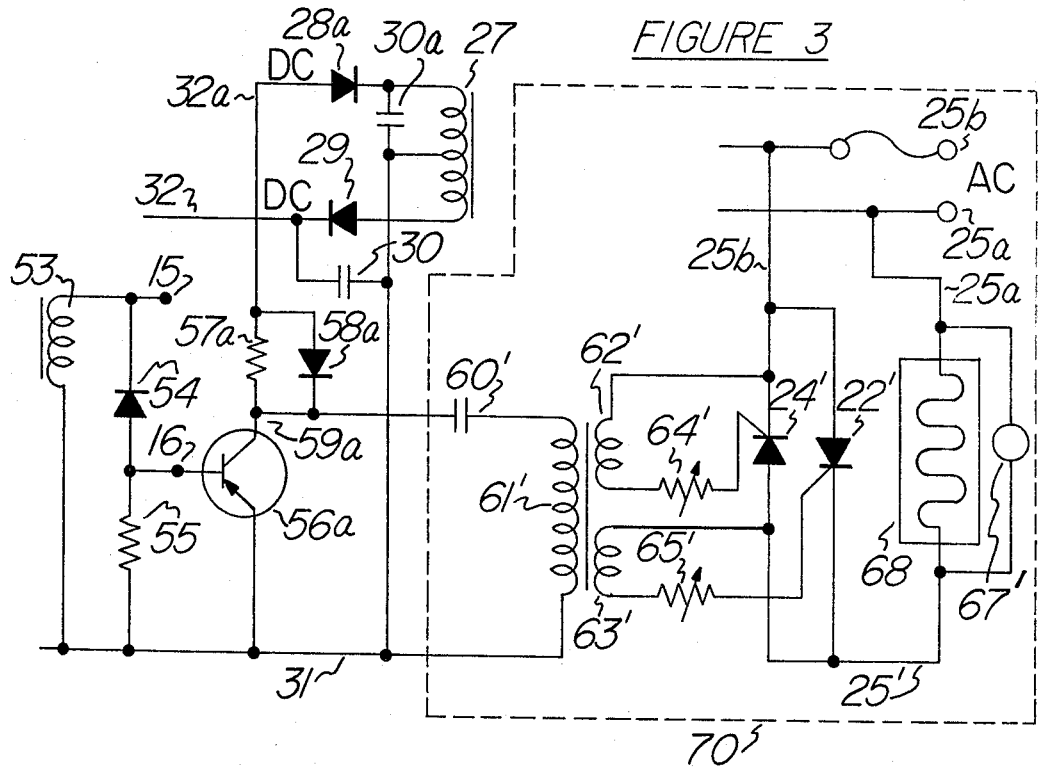
FIGURE 3 is part of a circuit diagram for controlling a cooling element which may be an individual temperature control circuit or may be combined with the circuitry in FIGURE 2 to provide a universal temperature sensing and control system.

The current induced in coil 53 would be in such direction so as to provide a negative signal at terminal 15. Such negative signal would pass through diode 54 and be applied through resistor 55. The negative signal would then appear at terminal 16. FIGURE 3 shows circuitry for operating a cooling system under such conditions.

Assuming now that terminal 15 is held at substantially positive potential (which is a pulsing positive potential) transistor 56 is driven to conduction in accordance with the pulsing positive signal. Resistor 57 serves as the load in the collector circuit and diode 58 serves to clip the spikes produced during the turn-off period of transistor 56, caused by the pulsing positive potential and total cutoff of transistor 56.

The amplified signal at the collector circuit 59 is applied through capacitor 60 to the coil 61 of the split coupling, the signal returning to the D.C. return or ground via lead 31.

The pulsing signal appearing across coil 61 is induced in the coils 62 and 63 as substantially identical pulsing signals. Coil 62 and series connected adjustable resistor or potentiometer 64 are connected as an adjustable gate, for applying the induced pulsed signal to the gate of S.C.R. 24 for controlling conduction of the S.C.R. 24. Potentiometer 64 may be adjusted so as to vary the amount of signal applied to the gate of the S.C.R. 24. Potentiometer 65, in series with coil 63 is connected as an adjustable gate to the gate of S.C.R. 22, providing control of conduction of S.C.R. 22, in the same manner.

These identical circuits, which are individually adjustable, and receive identical pulsing signals, provide for individually controlling the conduction angle of the silicon controlled rectifier to which each is connected. The frequency of the pulsed signals applied to the respective S.C.R. and the amplitude of the signals determine the relative amount of bias applied to the respective S.C.R. Thus precise angular control of each wave is obtained.

The S.C.R.'s 24 and 22 are connected back-to-back in one lead, 25b of the A.C. source applied to the heater 26, across which there is an indicator lamp 67. The A.C. on lead 25b is applied to the parallel connected, back-to-back S.C.R.'s so that the phases of the A.C. waves are individually controlled in accordance with the signals applied to the gate of the respective S.C.R.'s.

The A.C. waves passing through the two S.C.R.'s are joined at lead 25' so that each phase of the A.C. may be applied to heater 26. Lead 25a is connected to the other side of heater 26 to complete the A.C. circuit.

Referring now to FIGURE 3 it will be noted that coil 53, diode 54, resistor 55 and terminals 15 and 16 are illustrated. It will be appreciated that the free running multivibrator and temperature sensitive balanced bridge circuit are coupled to coil 53 via the coil 52, as shown in FIGURE 2. Further, it will be noted that the circuitry in broken line block 70 is substantially the corresponding circuitry in broken line block 69 in FIGURE 2, except that the heater 26 is now replaced by a cooling device 68. Corresponding components in block 70 as in block 69, between FIGURES 3 and 2 are labelled with corresponding reference characters except those in block 70 in FIGURE 3 have had a "prime" added to the reference character.

The full wave rectifier of FIGURE 2 has been replaced with two half-wave rectifiers in FIGURE 3 for providing a positive D.C. lead 32 and a negative D.C. lead 32a with respect to the return 31. Diode 28a will pass negative D.C. through resistor 57a to the collector 59a of transistor 56a. Transistor 56 of FIGURE 2 is illustrated as an NPN type while transistor 56a in FIGURE 3 is illustrated as a PNP type transistor.

Since the potential at terminal 49 will be more positive than the potential at terminal 50 when the thermistors sense an increase in temperature over the desired temperature, the direction of current flow through coil 52 will cause the pulsing signal induced in coil 53 to be negative at its upper side. The pulsing negative signal is applied to diode 54 which passes such signal to resistor 55, connected to the return 31. Thus the pulsing negative signal is applied to terminal 16, terminal 15 being held at substantially ground potential. The negative signal applied to the base of transistor 56a drives transistor 56a to conduction. The amplified signal, which is a pulsing signal is applied to the capacitor 60' from the collector circuit 59a. The remainder of the circuitry functions are similar to that described with reference to corresponding circuitry in block 69 in FIGURE 2 except that a cooling element, 68 is controlled in FIGURE 3.

Figure 4:
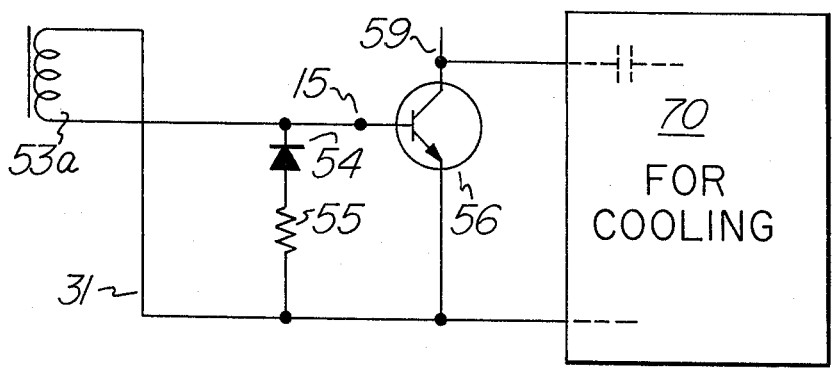
FIGURE 4 is a circuit diagram showing an alternate form of circuitry for a cooling control circuit.

FIGURE 4 illustrates alternate circuitry for providing control of a cooling device in which the leads of coil 53 in FIGURES 2 and 3 have been reversed so as to provide a pulsing positive signal to terminal 15 when an increase in temperature is sensed. In this arrangement transistor 56 (NPN type) is connected to terminal 15 and since the coil 53a is reversed, the signals provided by coil 52 and induced in coil 53a will be reversed with respect to terminal 15. This alternate circuitry has the advantage of providing a temperature sensing and control system for controlling a cooling device without the need of providing a negative D.C. source. Block 70 for cooling represents the circuitry found in block 70 in FIGURE 3.

Figure 5:
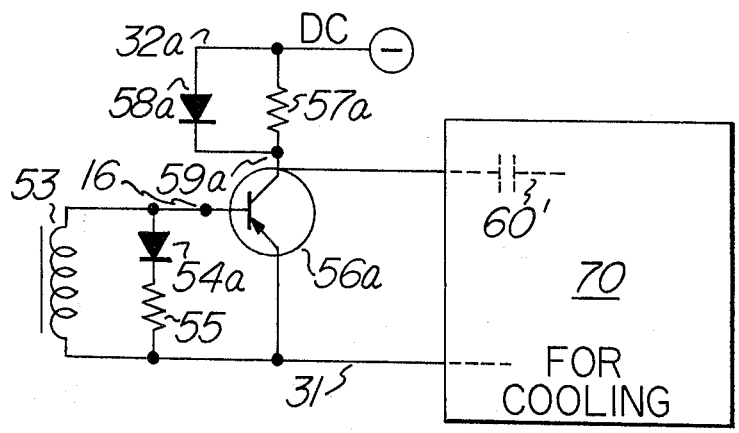
FIGURE 5 is a circuit diagram showing another alternate form of circuitry for a cooling control circuit.

FIGURE 5 is another alternate circuit arrangement for controlling a cooling device by using a PNP type transistor 56a in which the diode 54a is placed in the reverse direction from diode 54 in FIGURES 2, 3 and 4. A negative D.C. source must be provided for the collector circuit of transistor 56a. The leads of coil 53 are the same as coil 53 in FIGURES 2 and 3. In this arrangement positive signals on the upper side of coil 53 will be passed by diode 54a to resistor 5 so that terminal 16 of FIGURE 5 will be held at ground potential. A negative pulsing signal will be applied to terminal 16 and will drive transistor 56a to conduction. The remainder of the circuitry of block 70 is similar to that shown in block 70 in FIGURE 3.

Figure 6:
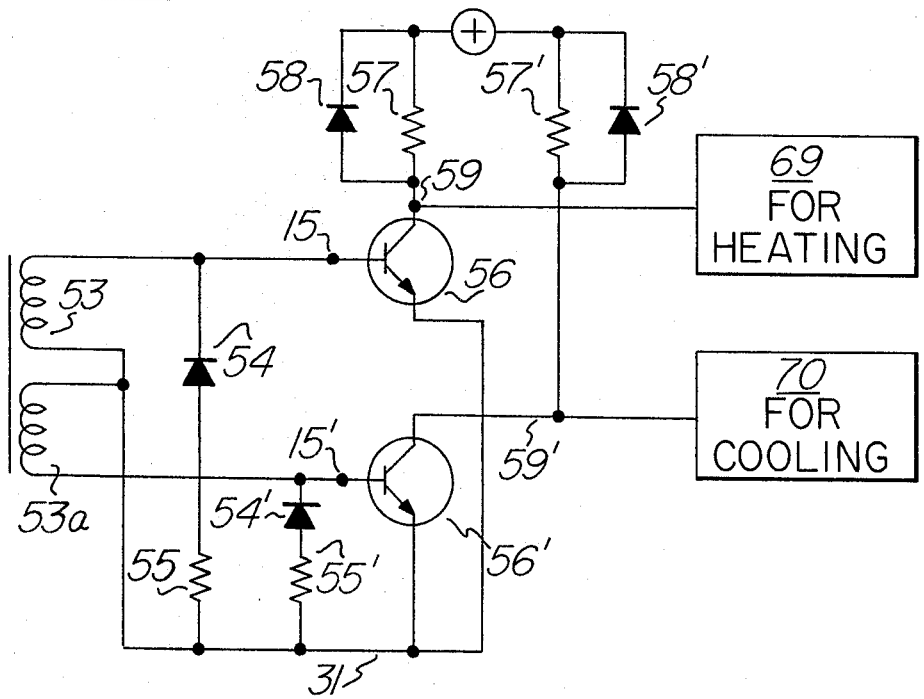
FIGURE 6 is part of a circuit diagram showing an alternate form of universal temperature sensing and control circuit which may be connected to the temperature sensing circuirty of FIGURE 2.

FIGURE 6 is a circuit arrangement for conveniently providing a universal temperature sensing and control system in which a heating control circuit 69 and a cooling control circuit 70 are independently operated. FIGURE 6 is a combination of circuitry shown in FIGURES 2 and 4. Coil 53 and 53a would each be part of the transformer of which coil 52 in FIGURE 2 is a part.

In FIGURE 6 a circuit arrangement is provided so that the polarity of the signals appearing in coils 53 and 53a will be opposite to each other. Thus a signal in coil 52 (not shown in FIGURE 6) indicative of a need for heat will provide a positive signal at terminal 15 and a negative signal or ground at terminal 15'. A signal in coil 52 indicative of the need for cooling will provide a positive signal at terminal 15' and a negative or ground signal at terminal 15. Both transistors 56 and 56' are of the same type and both respond to signals of like polarity. The circuitry and functions in block 69 (for heating) are similar to the circuitry and functions described relative to block 69 in FIGURE 2. The circuitry and functions in block 70 (for cooling) are similar to the circuitry and functions described relative to block 70 in FIGURE 3.

Referring to the adjustable temperature sensitive balanced bridge circuit of FIGURE 2, it may be desired to use a less sensitive bridge circuit for either control of a heating element or control of a cooling element.

For control of a heating element by use of a less sensitive bridge circuit thermistor 46 may be replaced by a fixed resistor while thermistor 45 will be retained in the bridge circuit. This assumes that thermistor 45 has a positive coefficient, that increases in resistance with an increase in temperature. A temperature sensitive balanced bridge circuit using only thermistor 45 would control a heating element, not a cooling element. To provide a less sensitive temperature sensitive balanced bridge circuit for controlling a cooling element thermistor 45 could be replaced with a fixed resistor and thermistor 46 would be retained in the bridge circuit. These latter two arrangements may reduce the cost of a temperature sensitive balanced bridge circuit.

It will be obvious to those who are familiar with and are skilled in the art that thermistors with negative coefficient may also be used in the balanced bridge circuit, however this would result in reversal of temperature change sensing signals and temperature control as described herein.

I have thus described my invention in several different forms and arrangements and have suggested alternated circuitry for such arrangements. Obviously, other circuit arrangements such as by rearrangement of circuitry and substitution of parts may be made, as will be obvious to those skilled in the art, without departing from the spirit of the invention as defined in the appended claims.

I claim:

1. A temperature sensing and control system including:

an alternating current source, means for rectifying the alternating current into direct current, said rectifying means coupled to said source,
a free running multi-vibrator including at least a unijunction transistor and driven by said direct current for providing a pulsed output,
a temperature sensitive balanced bridge circuit including a thermistor in each of two opposing legs for sensing temperature, a variable resistor in the third leg for resistively balancing said bridge circuit when said thermistors sense a predetermined temperature and a fixed resistor in the leg opposite the third leg.
means for coupling the pulsed output to the input of said balanced bridge,
means for coupling the output of said balanced bridge to said unijunction transistor,
means for sensing the potential difference across said balanced bridge for providing a first signal representative of a change in temperature in one direction from said predetermined temperature and for providing a second signal representative of a change in temperature in the other direction from said predetermined temperature and for providing a third signal representative of said predetermined temperature,
means for amplifying said first signal,
means coupled to said amplifier means for providing two identical signals each proportional to the amplified signal,
a temperature varying element having first and second inputs, said first input coupled to one side of the said alternating current source,
a pair of phase sensitive elements coupled in parallel back-to-back to the other side of said source,
means for coupling one of said two identical signals to one of the phase sensitive elements,
means for coupling the other of said two identical signals to the other of the phase sensitive elements,
said second input of said temperature varying element coupled to said pair of phase sensitive elements for completing the alternating curent circuit for operating said temperature varying element through said phase sensitive elements.

2. A temperature sensing and control system as in claim 1 and in which said means for coupling one of said two identical circuits to one of the phase sensitive elements includes a variable resistor for varying the value of the signal so coupled to the one phase sensitive element.

3. A temperature sensing and control system as in claim 1 in which said first signal represents a decrease in temperature and,
said temperature varying means is a heating device.

4. A temperature sensing and control system as in claim 1 in which said first signal represents an increase in temperature and,
said temperature varying means is a cooling device.

5. A temperature sensing and control system as in claim 1 in which said free running multi-vibrator includes,
a resistance-capacitance timing circuit for controlling the pulse rate frequency of said multi-vibrator and said pulse rate frequency is at a ratio of 66 to 1 with respect to the frequency of the alternating current source.

6. A temperature change sensing and temperature control circuit including:
an alternating current source having a first lead and a second lead,
a direct curent source having a relatively positive side and a ground return,
a unijunction transistor having a first base, a second base and an emitter, for passing direct current pulses at a predetermined rate,
said first base connected to said relatively positive side of said direct current source through a load resistance,
a resistor connected between said direct current source and said emitter,
a temperature sensitive balanced bridge circuit having an input and an output at opposite points on said bridge and a first terminal and a second terminal at other opposite points on said bridge,
said second base connected to said input for applying said pulses to said bridge, said output of said bridge connected to said return,
a capacitor connected between said output and said emitter, said resistor and said capacitor for timing said pulse rate,
said balanced bridge circuit including:
a first thermistor for sensing temperature connected between said input and said first terminal,
a second thermistor for sensing temperature connected between said output and said second terminal,
a resistance connected between said input and said second terminal,
said first thermistor and said second thermistor for balancing said bridge at a predetermined temperature,
means coupled to said first terminal and to said second terminal for providing a signal when said bridge is out of balance,
means for amplifying said signal,
means for providing two identical control signals in response to the amplified signal,
a temperature varying device having a first input and a second input, said second input connected to said second lead of said alternating current source,
a first silicon controlled rectifier and a second silicon controlled rectifier connected in parallel between said first input and said first lead for individually passing opposite phases of said alternating current source,
the first control signal of said two identical signals coupled to said first silicon controlled rectifier for controlling said first rectifier in accordance with the amplitude of said first signal,
the second control signal of said two identical signals coupled to said second silicon controlled rectifier for controlling said second rectifier in accordance with the amplitude of said second signal so that the individual phases of the alternating current source applied to said temperature varying device will be controlled in accordance with the temperature change sensed by the thermistors.

7. A temperature change sensing and temperature control circuit as in claim 6 in which said means for providing two identical control signals includes,
means individual to each control signal for individually varying the value of the signal applied to the respective said rectifier with respect to the value of each said control signal.

8. A temperature change sensing and temperature control circuit as in claim 6 and in which said resistance connected between said input and said second terminal is variable so as to variably adjust the temperature at which the temperature sensitive balanced bridge circuit will become balanced.

9. A temperature change sensing and temperature control circuit as in claim 6 and in which said means coupled to said first terminal and to said second terminal provides,
a first signal when the bridge is out of balance due to the thermistors sensing a decrease in temperature from the predetermined temperature and,
provides a second signal when the bridge is out of balance due to the thermistors sensing an increase in temperature and last mentioned said means includes,
a terminal for coupling said first signal to said amplifying means and,
means for returning said second signal to said ground return.

10. A temperature change sensing and control system as in claim 9 and in which said temperature varying device is a heating element.

11. A temperature sensing and control system including:
an alternating current source,
means for rectifying the alternating current into direct current, said rectifying means coupled to said source,
a free running multi-vibrator driven by said direct current for providing a pulsed output,
a temperature sensitive balanced bridge circuit having an input and an output at opposite points on said bridge, and a first terminal and a second terminal at other opposite points on said bridge,
said balanced bridge circuit including
a first thermistor for sensing temperature connected between said input and said first terminal,
a second thermistor for sensing temperature connected between said second terminal and said output,
a variable resistance connected between said input and said second terminal for balancing said bridge when said first and second thermistors sense a predetermined temperature.
and a second resistance connected between said first terminal and said output,
means for coupling the pulsed output to the input of said bridge,
means for coupling the output of said bridge to said multi-vibrator for providing load for said multi-vibrator,
means coupled to said first terminal and to said second terminal for sensing the potential difference across said bridge for providing a first signal when the temperature sensed by said thermistors varies in one direction from said predetermined temperature, and for providing a second signal when the temperature sensed by said thermistors varies in another direction from said predetermined temperature,
means for amplifying said first signal,
means coupled to said amplifier means for providing two identical signals, each proportional to the amplified signal,
a temperature varying element having first and second inputs, said first inputs coupled to one side of the said alternating current source,
a pair of phase sensitive elements coupled in parallel back-to-back to the other side of said source,
means for coupling one of said two identical signals to one of the phase sensitive elements,
means of coupling the other of said two identical signals to the other of the phase elements, and
said second input of said temperature varying element coupled to said pair of phase sensitive elements for completing the alternating current circuit for operating said temperature varying element through said phase sensitive elements.

12. A temperature sensing and control system, as in claim 11, and said system further includes
second means for amplifying said second signal,
means coupled to said second amplifier means for providing two other identical signals, each proportional to the amplified signal of said second amplifying means,
a second temperature varying element for affecting temperature adverse to the effect on temperature of the first mentioned temperature varying element, said second temperature varying element having first and second inputs, said first input coupled to one side of said alternating current source,
a second pair of phase sensitive elements coupled in parallel back-to-back to the other side of said source,
means for coupling one of said two other identical signals to one of the phase sensitive elements of said second pair,
means for coupling the other of said two other identical signals to the other phase sensitive element of said second pair, and
said second input of said second temperature varying element coupled to said second pair of phase sensitive elements for completing the alternating current circuit for operating the second temperature varying element through said second pair of phase sensitive elements.

13. A temperature sensing and control system as in claim 12, and in which the amplitude of said first signal provided by said sensing means is proportional to the difference between the temperature sensed and said predetermined temperature when the temperature varies in said one direction and the amplitude of said second signal provided by said sensing means is proportional to the difference between the temperature sensed and said predetermined temperature when the temperature varies in said other direction, and
each phase sensitive element of each pair of phase sensitive elements includes amplitude sensitive means for controlling the magnitude of alternating current passed in accordance with the amplitude of said two identical signals and the said two other identical signals respectively.

14. A temperature sensing and control system, as in claim 11, and in which said means for coupling one of said two identical circuits to one of the phase sensitive elemets includes
a variable resistance means for varying the value of the signal so coupled to the one phase sensitive element.

15. A temperature sensing and control system, as in claim 11, in which
said first signal represents a decrease in temperature and
said temperature varying element is a heating element.

16. A temperature sensing and control system, as in claim 11, in which
said first signal represents an increase in temperature and
said temperature varying element is a cooling element.

References Cited by the Examiner
UNITED STATES PATENTS

| 2,994,759 | 8/1961 | Lipman | 219—499 |
| 3,107,285 | 10/1963 | Knapp | 219—501 |
| 3,159,737 | 12/1964 | Dora | 219—499 |
| 3,175,077 | 3/1965 | Fox et al. | 219—501 |
| 3,235,711 | 2/1966 | Bergen et al. | 219—501 |

RICHARD M. WOOD, *Primary Examiner.*

ANTHONY BARTIS, *Examiner.*

L. H. BENDER, *Assistant Examiner.*